Patented Dec. 1, 1931

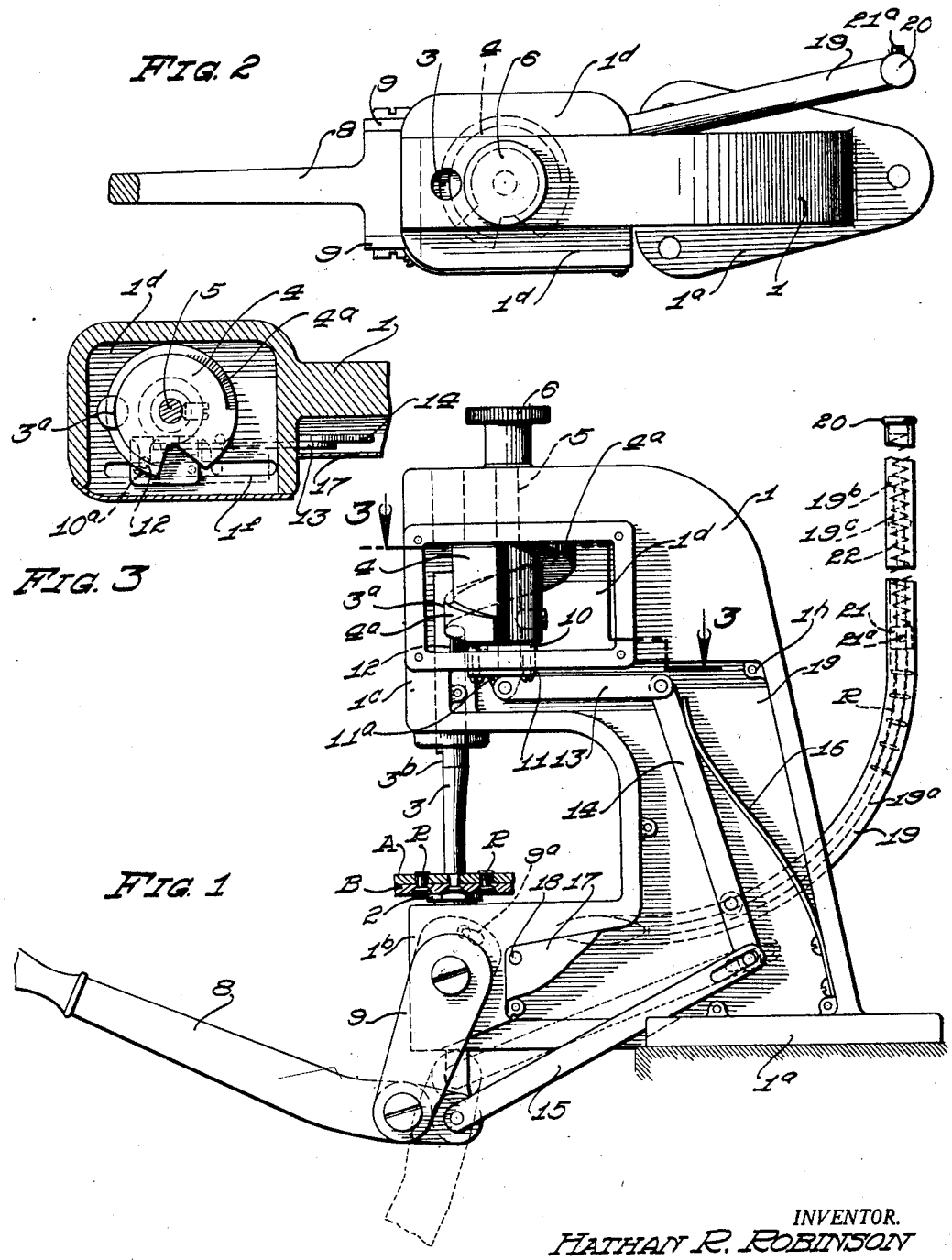

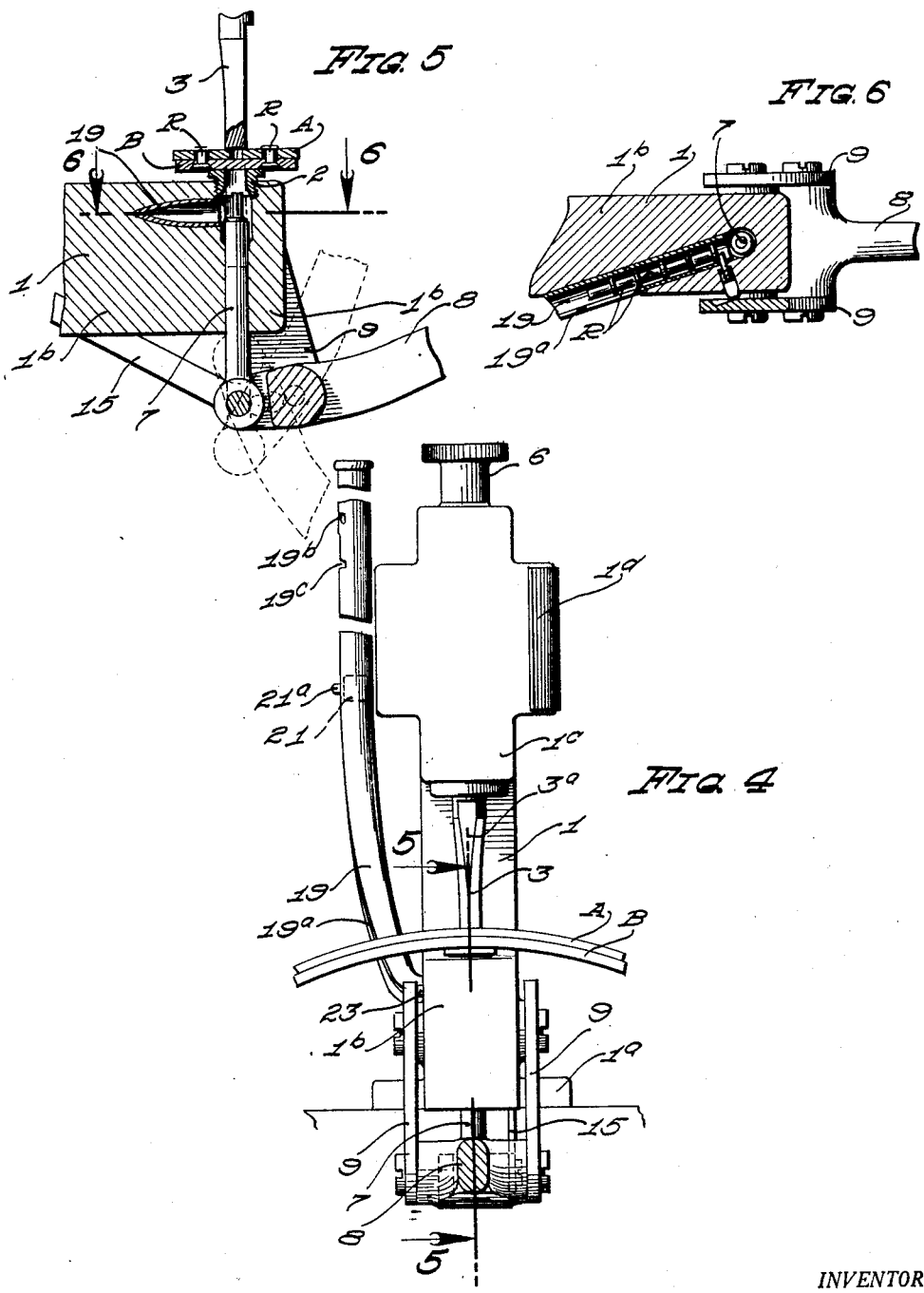

1,834,221

UNITED STATES PATENT OFFICE

NATHAN R. ROBINSON, OF LOS ANGELES, CALIFORNIA

AUTOMATIC PIERCING, COUNTERSINKING AND RIVETING MACHINE

Application filed June 5, 1928. Serial No. 283,085.

My invention relates to automatic piercing, counter-sinking and riveting mechines.

The objects of my invention are: first, to provide a machine of this class which is particularly adapted for securing brake lining to brake bands, although the same is also equally well adapted for piercing, counter-sinking and riveting purposes in other arts; second, to provide a machine of this class whereby the piercing, counter-sinking and riveting operations are automatic, effected in continuous sequence and substantially simultaneously; third, to provide a machine of this class which is automatically adjusted for various thicknesses of materials to be riveted together, such as varying thicknesses of brake bands and brake band liners; fourth, to provide a machine of this class whereby the work of ordinary thicknesses, is automatically released, and whereby work of more than ordinary thicknesses may be secured and released by separate manual means, the latter means also effecting a greater opening between the operative jaws when desired; fifth, to provide novel means for clamping the work against a supporting means, the former being shifted toward the latter by resilient means but positively held against the work; sixth, to provide a machine of this class whereby the hole for the rivet and the counter-sink for the rivet head in the brake lining is made by the rivet, and in which the depth of the counter-sink for the rivet head is limited by the work supporting means which is adjustable for varying the depth of the counter-sink for various thicknesses of brake lining, and the like; seventh, to provide a novel automatic rivet feed mechanism in connection with a machine of this class; eighth, to provide a machine of this class whereby the operations of feeding the rivets, clamping the work, and of piercing, counter-sinking and riveting may be effected by separate manual operation, if desired, for producing a more simple and economical machine; ninth, to provide as a whole a novelly constructed machine of this class, and one having novelly coacting features; and, tenth, to provide a machine of this class which is simple and economical of construction proportionate to its functions, durable, efficient, simple and easy to operate, and which will not readily deteriorate or get out of order.

With these and other objects in view, as will appear hereinafter, my invention consists of certain novel features of construction, combination and arrangement of parts and portions, as will be hereinafter described in detail and substantially as set forth in the appended claims, reference being had to the accompanying drawings and to the characters of reference thereon which form a part of this application in which:

Figure 1 is a fragmentary side elevational view of my machine in its preferred form of construction embodying the automatic features in one form, showing certain parts removed to facilitate the illustration, showing by dotted lines certain parts shifted to different operative positions, and showing in cross section a brake band and brake lining secured to the latter positioned between the operative jaws or members of the machine; Fig. 2 is a top view thereof; Fig. 3 is a fragmentary sectional view thereof taken through 3—3 of Fig. 1, showing by dotted lines certain parts shifted to other operative positions; Fig. 4 is a fragmentary front elevational view thereof, showing a segment of a brake band and brake lining in operative position on the machine; Fig. 5 is a fragmentary sectional elevational view thereof, taken through 5—5 of Fig. 4, showing by dotted lines several shifted positions of some of the members; and, Fig. 6 is a fragmentary sectional view thereof taken through 6—6 of Fig. 5.

Like characters of reference refer to similar parts and portions throughout the several views of the drawings.

My machine is embodied in a suitable frame 1 which, as shown in the drawings, is cast in one piece. The frame is provided at its base with a supporting and securing flange 1a for securing the same to a bench or other suitable means. This frame is provided at its lower portion with a forwardly extending supporting arm 1b and at its upper portion with a forwardly extending head 1c directly above and spaced from the supporting arm 1b.

At the upper side and near the forward end of the arm 1b, is provided a work supporting means which consists preferably of a bushing 2, which is screwably mounted in the arm and adapted to be raised and lowered relative thereto for the purposes hereinafter described. In the head 1c is reciprocally mounted a combined work positioning, stop, and rivet head forming member 3 which is positioned in alignment with the member 2 and shiftable toward and away from the same, preferably on the axis with the latter. When the member 3 is shifted toward the member 2, the same is adapted to clamp the work against the latter at the portion through which the rivet is to be forced. The member 3 is shifted upwardly and downwardly by a cam 4 which is rotatably mounted in a recess 1d in the head 1c and on an axis parallel to the axis of the member 3. This cam is in the form of a large screw having at its exterior a wide helical cam or threaded portion 4a which extends into a correspondingly shaped recess 3a in the side of the member 3 so that when the cam or screw 4 is rotated, the member 3 is either raised or lowered. This cam or screw is secured to a spindle 5 which extends vertically through the recess 1d and beyond the upper end of the frame 1. To the upper end of the spindle is secured a knob 6 for manually rotating the cam and shifting the same relative to the supporting member 2.

In the arm 1b is provided a vertical bore 1e which is in axial alignment with the bushing 2. In this bore is reciprocally mounted a plunger 7 which extends below the lower side of the arm 1b and is pivotally connected at its lower end to the end of a lever 8 which in this instance is a hand operated lever for operating the machine. The lever 8 is pivotally mounted, a short distance backwardly from the pivotal connection with the plunger 7, to the lower or free ends of a pair of links 9 which are pivotally mounted at their opposite ends on the opposite lateral sides of the arm 1b of the frame. By this arrangement of lever and links, the plunger 7 is forced without distortion into the bore and under very great force. The screw 4 is also automatically rotatable by a slide which is reciprocally mounted on the wall forming the lower side of the recess 1d. This wall is provided with a slot 1f which extends backwardly and forwardly therein. The slide 10 extends through said slot and is retained in reciprocal relation relative to said wall and the inner side thereof by a plate 11 secured to the portion extending below said wall. The slide 10 is provided with a transverse slot 10a which is adapted to receive a pin 12 secured to and extending downwardly from the lower end of the screw 4 and near the peripheral portion thereof. As the screw is rotated, the slide is also adapted to be shifted in the slot 1f, or as the slide is shifted the screw is rotated. The retaining plate 11 is provided with a downwardly extending lug 11a to which is pivotally connected the one end of a link 13 which link is pivotally connected at its opposite end to one end of a lever 14. Said lever 14 is pivotally mounted intermediate its ends on the frame 1. The opposite end of the lever is pivotally and slidably connected to one end of the link 15 which is pivotally connected at its opposite end to the operating lever 8 at the axis thereof connected with the plunger 7. The end of the link 15 connected with the lever 14 is longitudinally slotted so that the screw 4 may be operated independently of the lever 8 and so that the latter may be shifted independently of the former. The slide 10 is resiliently forced forwardly toward the front side of the machine, tending to force the member 3 downwardly, by a spring 16. This spring may be a leaf spring which may be secured at one end to the frame 1 and engages at its opposite end the lever 14. The lever 14, the link 13, the one end of the link 15 connected with the lever 14, and the spring 16 are positioned in a recess 1g at one side of the frame. This recess is enclosed by a plate 17, shown in Figs. 1 and 3. This plate may be secured in position by screws 18 which extend into lugs 1h within the recess or opening 1g.

The rivets R are fed into the machine from a rivet feed tube 19 which extends into one side of the arm 1b of the frame 1 at an angle, as shown in Fig. 6 and which extends backwardly and upwardly in curved form. At the upper end of the tube is provided a cap 20 and within the tube is provided a slide 21 which is forced downwardly or toward the discharge end of the tube by a compression spring 22 for forcing the rivets into the bore 1e on to the inner end of the plunger 7. In order to fill the tube with rivets, the slide 21 is drawn backwardly against the compression of the spring 22 by a knob 21a which extends through a longitudinal slot 19a in the side of the tube. Near the upper end of the slot 19a may be provided a bayonet lock slot 19b so that when the slide is drawn backwardly or upwardly, the same may be rotated slightly and held in the slot 19b permitting rivets to be fed into the tube through an enlarged portion 19c in the side of the tube, as shown best by dotted lines in Fig. 1. In the side wall of the arm 1b of the frame is reciprocally mounted a plunger 23 which is provided with an inner reduced end 23a extending into the tube 19 and adapted to prevent the rivets from being discharged from the inner end of the tube. The plunger 23 is adapted to be forced from the tube 19 by a compression spring 24, but is prevented from being forced from the tube by the link 9 at the one side of the machine, as shown best in Fig. 6. This link, however, is provided with a cam slot 9a which is adapted to receive the plunger 23 when the links 9 are shifted inwardly. When the plunger 23 enters the cam slot 9a, the next rivet is released and forced by the action of the spring against the plunger 7 and held in such position until the links 9 are again drawn outwardly which curves, when the plunger 7 is withdrawn. The plunger 23 is then forced inwardly and adapted to be engaged by the next rivet head while the one released drops downwardly head first on to the inner end of the plunger 7. The upper end of the bore 1e is slightly enlarged and conical at the lower end of the enlarged portion facilitating the positioning of the rivet head on to the inner end of the plunger 7, the lower position of the plunger 7 being indicated by dotted lines in Fig. 5.

The operation of the machine is as follows:

When the machine is in a position for receiving work, that is when the member 7 is raised, the operating lever 8 is also in a raised position, as shown by dotted lines in Fig. 5. The lever 8 is then shifted downwardly so that the lower end of the member 3 almost touches the work which, as shown, consists of a brake band A and brake band lining B. The work is then shifted back and forth until the hole in the brake band is substantially in alignment with the member 3. It will be noted that when the lever 8 is shifted, as shown by solid lines, the lever 14 is released by reason of the slot in the one end of the link 15, permitting the spring 16 to force the slide 10 forwardly and to rotate the screw 4 which forces the member 3 downwardly. As the lever 8 is forced still farther downwardly, substantially to the position shown, the member 3 engages the upper side of the brake band and substantially clamps the same between the member 3 and the member 2. Then the rivet R, placed at the inner end of the plunger 7, as shown in Fig. 5, is forced upwardly through the brake lining puncturing the same and automatically countersinking the lining by the force of the plunger. The upper end of the rivet engages the lower end of the member 3 forming a head on the rivet against the upper side of the brake band. The lower end of the member 3 is preferably convex so as to conveniently form the rivet head. It will be noted, however, that the shape of the inner end of the member 3 may be in any desired form so as to form the head of the rivet into any shape desired. As the lever is raised from the lower dotted line position shown in Fig. 5 to the upper dotted line position, the rivet which has previously been released, as described above, drops downwardly head first to the end of the plunger 7, shown by dotted lines in Fig. 5. Also as the lever 8 is raised, the lower end of the link 14 reaches the end of a slot in the link 15 rotating the lever 14 against the action of the spring 16, forcing the slide 10 backwardly and rotating the screw 4 which raises the member 3. As the slide 10 is shifted to its extreme backward position, as shown by dotted lines in Fig. 3, the screw 4 is permitted to be rotated manually, that is, by the knob 6, a greater distance, which raises the member 3 so as to provide greater operating space between the work supporting and counter-sink limiting member 2 and the member 3.

It will be here noted that as the member 2 is raised, there is provided less distance between the extreme upper end of the plunger 7 and the member 2, thus limiting the insertion of the rivet into the brake band lining B or other work, therefore limiting the counter-sink of the rivet.

It will be here also noted that one side of the combined stop, positioning, and rivet head forming member 3 is preferably cut away at one side, as indicated by 3b so as to permit the work to be positioned as closely as possible to the axis of the member 3, which permits rivets to be inserted and riveted into brake bands not otherwise accessible.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a machine of the class described, a frame having a supporting means thereon, a stop member shiftably mounted adjacent and spaced with one end from and in opposed relation to said supporting means, screw means for positively adjusting the stop member relative to the supporting means, resilient means for actuating the screw means for forcing said stop member toward said supporting means, and a plunger reciprocally mounted in said frame in alignment with said stop member and adapted to extend through said supporting means.

2. In a machine of the class described, a frame, a combined supporting and countersink limiting member adjustably mounted on the frame, a plunger reciprocally mounted in said member and adapted to extend therethrough, and a stop member adjustably and shiftably mounted above the supporting and counter-sinking member in alignment with said plunger adapted to hold work between the same and said supporting and counter-sink limiting member.

3. In a machine of the class described, a frame, a combined supporting and countersink limiting member adjustably mounted on the frame, a plunger reciprocally mounted in said member and adapted to extend therethrough, a stop member shiftably mounted above the supporting and counter-sinking member in alignment with said plunger adapted to hold work between the same and said supporting and counter-sink limiting member, screw means for adjusting said stop member relative to said supporting and counter-sink limiting member and resilient means for actuating said screw means.

4. In a machine of the class described, a frame, a plunger reciprocally mounted in said frame, a stop member shiftably mounted on said frame in alignment with said plunger, screw means for shifting said stop member, resilient means for actuating said screw and for forcing said stop member toward said plunger, and means for reciprocating said plunger and for actuating said screw means against the action of said resilient means.

5. In a machine of the class described, a fame, a plunger reciprocally mounted in said frame, a stop member shiftably mounted on said frame in alignment with said plunger, screw means for shifting said stop member, resilient means for actuating said screw and for forcing said stop member toward said plunger, and means for reciprocating said plunger and for actuating said screw means against the action of said resilient means, said screw means being also adapted to be actuated independently of said last mentioned means for separating said stop member a greater distance from said plunger.

6. In a machine of the class described, a frame, a work supporting and counter-sink limiting means supported thereby, a plunger reciprocally mounted on said frame and adapted to extend through said means for forcing a rivet therethrough into the work to be riveted, said means being adapted to be adjusted relative to the end of said plunger extending through said means for varying the depth of the rivet counter-sink in said work, and means for holding said work against said supporting and counter-sink limiting means.

7. In the machine of the class described, a frame, a plunger reciprocally mounted in said frame, a stop member shiftably mounted on said frame in alignment with said plunger, means for shifting said stop member, resilient means for actuating said stop member shifting means and for forcing said stop member toward said plunger, and means for reciprocating said plunger and for actuating said stop member shifting means against the action of said resilient means, said stop member shifting means being also adapted to be actuated independently of said last mentioned means for separating said stop member a greater distance from said plunger.

8. In a machine of the class described, a frame, a work supporting and counter-sink limiting means supported thereby, a plunger reciprocally mounted on said frame and adapted to extend through said means for forcing a rivet therethrough into the work to be riveted, said means being adapted to be adjusted relative to the end of said plunger extending through said means for varying depth of the rivet counter-sink in said work, means for holding said work against said supporting and counter-sink limiting means, and means for automatically forcing the holding means against the work when the plunger is operated.

9. In a machine of the class described, a frame, a riveting plunger reciprocally mounted therein and having a fixed throw, a longitudinally movable stop member mounted in alignment therewith and spaced longitudinally therefrom, and an adjustable work-supporting and counter-sink limiting means positioned below the stop member and around and adapted to receive said plunger, said means forming in connection with said stop member a clamp means for the work, said means being adapted to vary the position of the work thereon with respect to the end of the plunger and thereby vary the depth of the counter-sink.

In testimony whereof, I have hereunto set my hand at Los Angeles, California, this 22nd day of May, 1928.

NATHAN R. ROBINSON.